Figure 1:
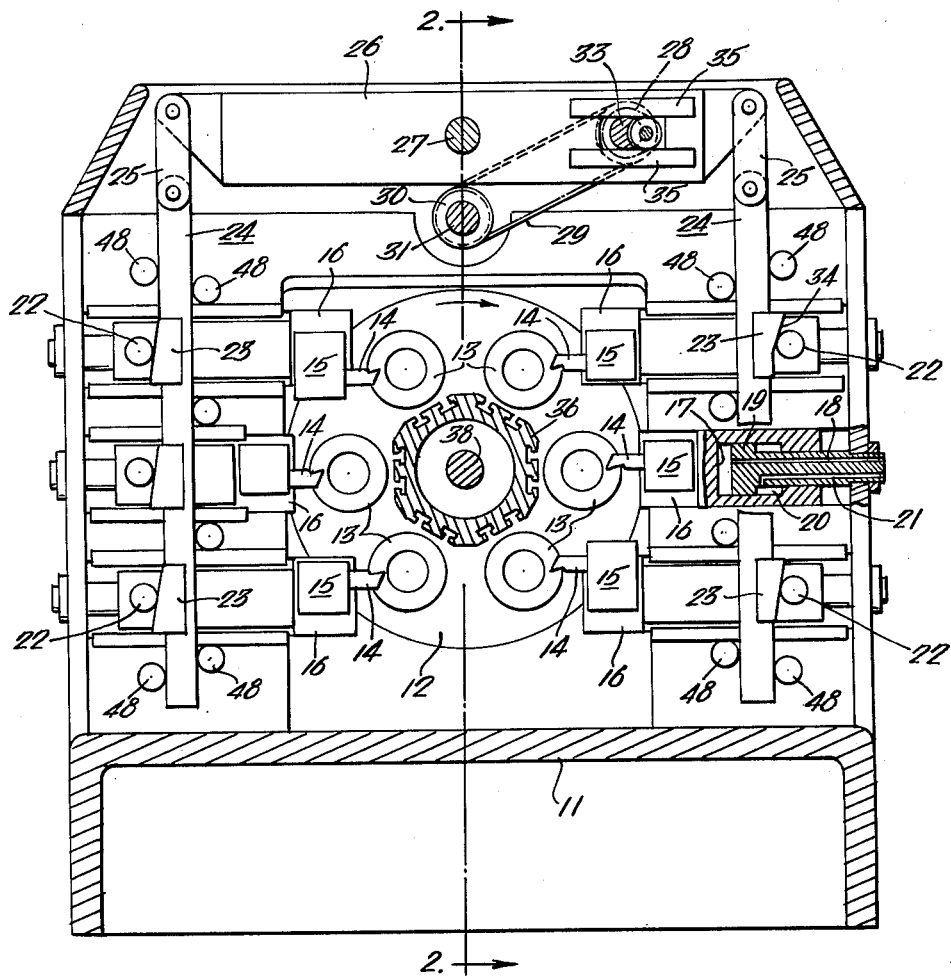

April 12, 1966 E. L. W. JOHANSSON 3,245,290
MACHINE TOOLS
Filed Oct. 29, 1963 4 Sheets-Sheet 1

FIG. I.

INVENTOR:
ERIK LENNART WALDEMAR JOHANSSON
BY Howson & Howson
ATTYS.

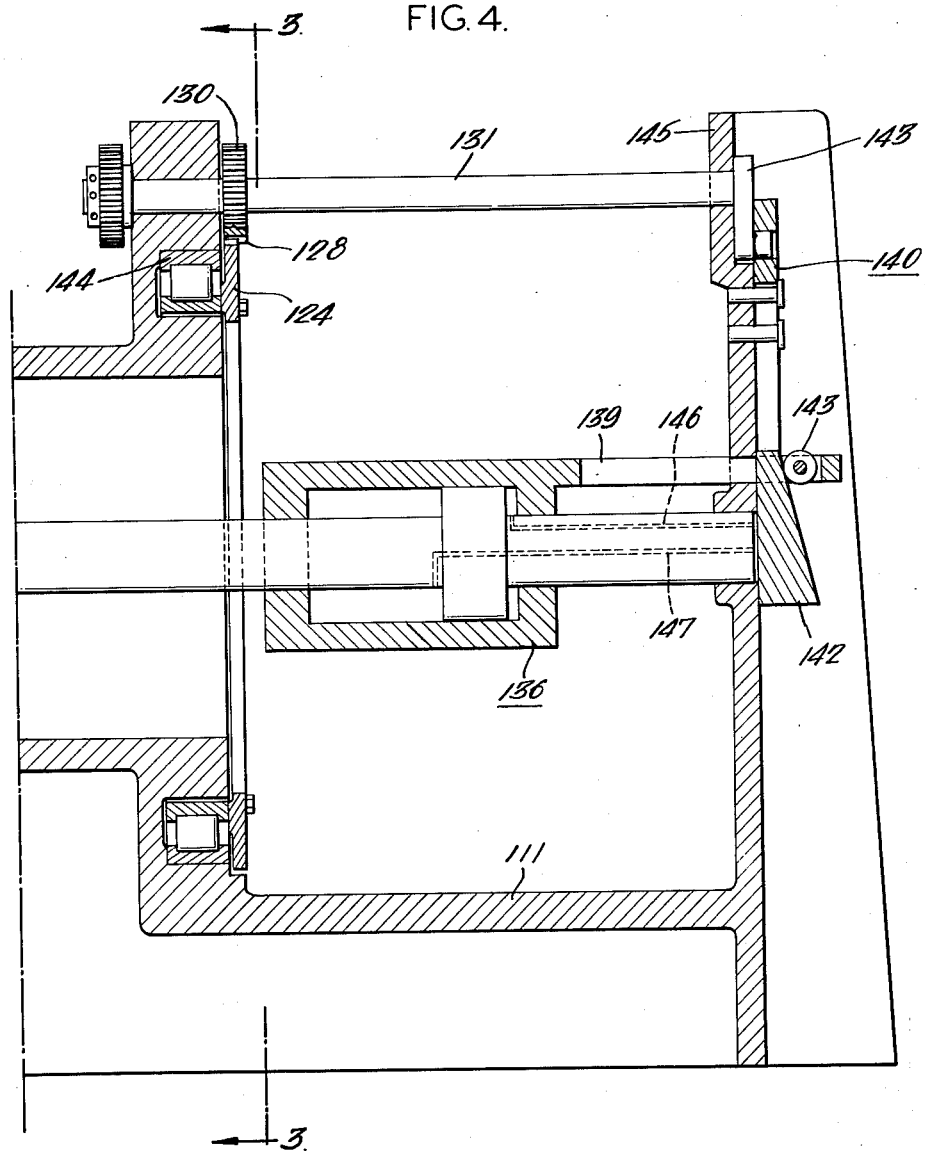

United States Patent Office 3,245,290
Patented Apr. 12, 1966

3,245,290
MACHINE TOOLS
Erik Lennart Waldemar Johansson, Goteborg, Sweden, assignor to Aktiebolaget Svenska Kullagerfabriken, Goteborg, Sweden, a corporation of Sweden
Filed Oct. 29, 1963, Ser. No. 319,909
Claims priority, application Sweden, Nov. 10, 1962, 12,075/62
7 Claims. (Cl. 82—3)

The present invention relates to improvements in machine tools. It is in the following described in connection with a multi-spindle automatic lathe for the successive machining of bar stock at a number of machining positions corresponding to the number of spindles, whereby the lathe is provided at each machining position with a tool slide which can be advanced toward the work, there being an axially displaceable main slide common to all the machining positions. In previously proposed lathes of this type the tool slides have been mechanically actuated, whereby cams have been provided for actuating the movement of the tool slides and at the same time transmitting the necessary force for feeding the slide. The cams must therefore be dimensioned to transmit the maximum feeding force, for which reason the various parts for transmitting these forces must be made comparatively heavy and will therefore be inconvenient to handle and expensive to make. In a lathe according to the invention the feed mechanism can be made much lighter without neglecting the requirements as to stability, reliability and precision. The invention is characterized mainly by mechanical means for governing the rate of movement of a hydraulically operated slide.

The invention is described in the following in connection with the accompanying drawings showing two examples of multi-spindle automatic lathes provided with devices which are characteristic of the invention. In the drawings FIG. 1 shows a cross section along the line I—I of FIG. 2 through a six-spindle automatic lathe having six horizontal tool slides.

Figure 2:
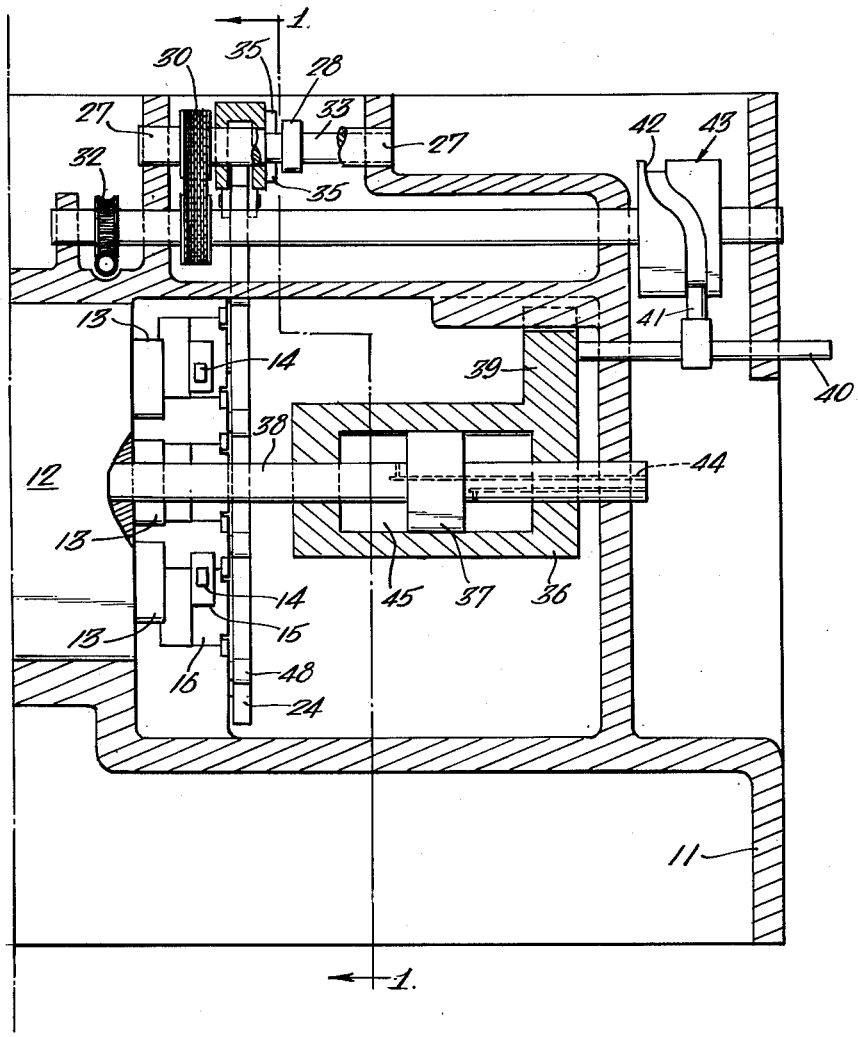
Figure 3:
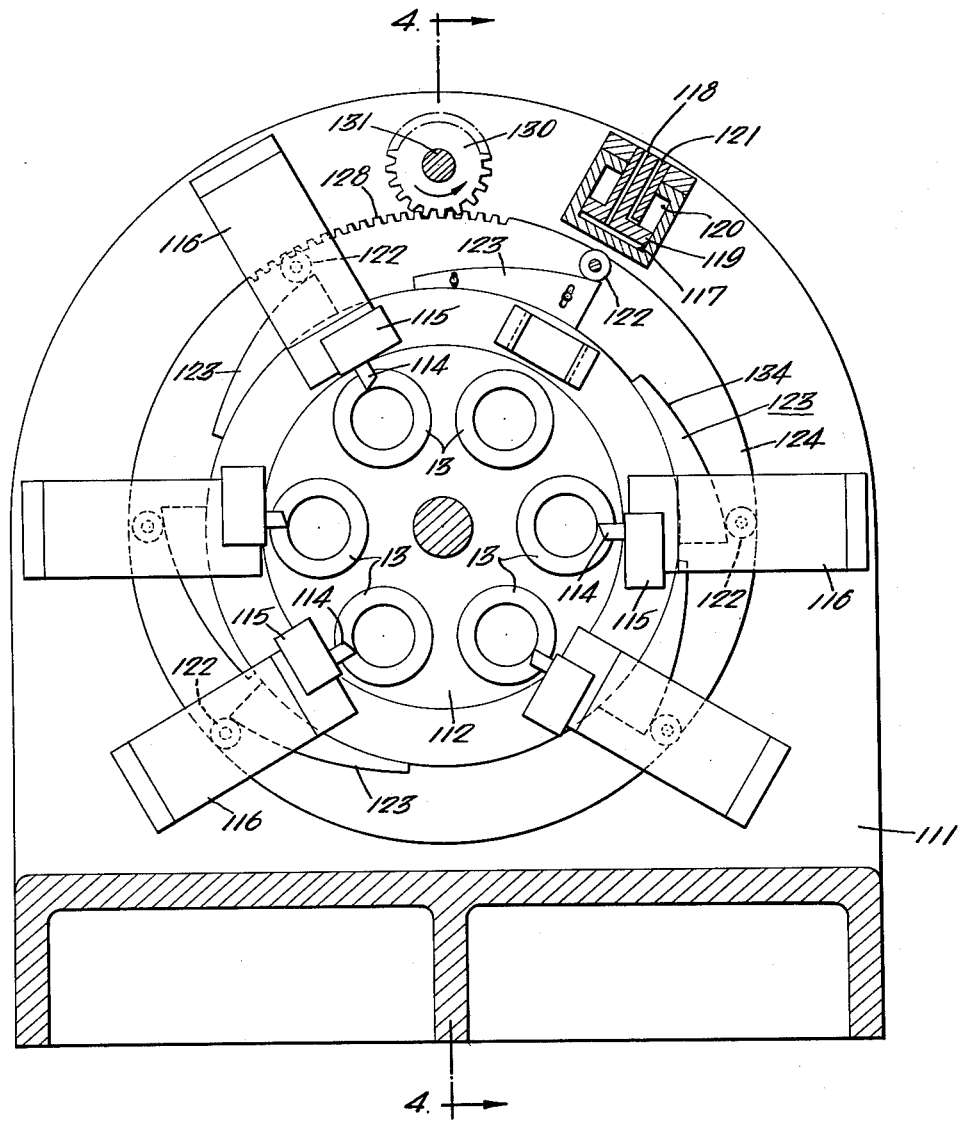

FIG. 2 shows a cross section through the same lathe along the line II—II of FIG. 1. FIGURES 3 and 4 show corresponding sections along the lines IV—IV and III—III respectively in a somewhat different form of the invention. The tool slides have been excluded in FIG. 4 to make it possible to show the feed device more clearly.

A machine bed designated 11 in FIGS. 1 and 2 carries a six-spindle rotatable chuck carrier 12 which carries six chucks 13. Each chuck is intended to accommodate bar stock which is successively machined in six operations. At each of the machining positions a certain machining operation is performed by means of a lathe tool 14 carried in a tool holder 15, which in turn is mounted on a tool slide 16. The slide 16 contains a cylinder 17 which is displaceable by means of hydraulic pressure admitted through a conduit 18 relative to a piston 19 fixed to the bed of the machine. Oil contained in an annular cylinder chamber 20 between the piston 19 and the cylinder 17 can be permitted to escape through a conduit 21. The area of the end wall of the cylinder 17 is considerably greater than the annular end wall of the chamber 20. The result is that if a certain quantity of oil is pressed in through the conduit 18 and evacuation at the same time takes place through the conduit 21, the movement of the cylinder and of the slide 16 will be much slower than if corresponding quantities are introduced through the conduit 21 and escape through the conduit 18. For this reason the return movement can take place much quicker than the feed movement.

One purpose of the present invention is to control the rate of feed of the lathe tool. If a relatively high hydraulic pressure, for instance 10 to 100 kg./cm.$^2$, were permitted to act on the cylinder 17, the lathe tool would be fed against the work piece with greater force but without a fixed rate of feed, unless special steps were taken for this purpose. In the device according to the invention the cylinders are advanced quickly from the position of rest under hydraulic pressure until rotatable rollers 22 on each tool slide come into contact with a cam 23, of which one is provided for each roller. The quick advance of the tool slides in the feeding direction is then checked. Three cams are fixed to each of two draw-bars 24 which are connected to a beam 26 through pivots 25, the beam being tiltable about an axle 27. Movement is transmitted from a reversible main motor (not shown) through a worm gear 32, a shaft 31 and a gear wheel 30 mounted on this shaft, a chain 29 and a shaft 33, and, finally, to a crank 28 fixed to a shaft 33 which tilts the beam about the shaft 27.

When the feed movement is to begin the crank 28 is in a position displaced ¼ turn clockwise from the position shown in FIG. 1, i.e. the crank pin is located substantially directly under the shaft 33, whereby the beam 26 will assume a position such that the rollers 22 engage the highest point of the cam surfaces of the cams 23. During the feed movement the crank 28 is turned anti-clockwise, thus tilting the beam and raising the right hand draw-bar 24 and simultaneously lowering the left hand draw-bar, both of which are guided by rollers 48. The rollers 22 will then roll along and follow the cams 23 being held against them by the hydraulic pressure. Since the surfaces 34 of the cams against which the rollers engage form an angle with the direction of movement of the draw-bars as shown in FIG. 1, the tool slides will move towards the respective work pieces. The amount of feed movement can be determined in two ways: either by varying the length of the stroke of the draw-bars during the machining operation, thereby utilizing a suitable portion of the length of the cams, or by changing the pitch of the cam surfaces or by varying both of these factors. One of the advantages of the present invention is the facility with which the feed movement of the tool slides can be adjusted individually with great accuracy.

The working cycle of a lathe according to FIGS. 1 and 2 is as follows: After the completion of the machining operation at each of the six machining positions the conduits 21 are put into communication with a source of pressure and the conduits 18 are opened to an exhaust, whereby the tool slides and their respective lathe tools are withdrawn from the workpieces. Thereafter the carrier 12 is turned 60° in the direction of the arrow and indexed so that each chuck will assume the position previously occupied by the adjacent chuck during the previous working operation.

The crank 28 is caused to assume its lowest position by turning the shaft 31 through the worm gear 32, whereby the highest point of the cams 23 will be located axially opposite the rollers 22. The work pieces are caused to assume the proper axial positions. Hydraulic pressure is now applied to the conduits 18 and the tool guides will be moved in a direction toward the work piece until the rollers 22 engage the cams 23. The hydraulic pressure and thereby the contact is maintained. The direction of movement of the crank 28 is now reversed to anti-clockwise, and since the crank is guided between two guides 35 the beam 26 will be tilted in the same direction. This movement of the beam will move the draw-bars 24 so that the right hand one in FIG. 1 will be displaced upwards and the left hand one downwards. Since the hydraulic pressure is constant, the rollers 22 will follow the surface 34 of the cams 23 and the lathe tools 14 will be fed towards the work at a rate which depends on the slope of the cam surfaces 34 relative to the direction of movement of the draw-bars 24. When the crank has reached its highest point the lathe tools have been fed in towards the workpiece as far as required, and the operation has been concluded. Thereafter the cycle is repeated.

A result similar to that obtained with a device according to FIGS. 1 and 2 can also be obtained by turning the cams to an opposite position and applying the hydraulic pressure in the opposite direction. The purpose of the cams will then be to force the tools against the work against the hydraulic pressure.

In the above only the feed of the tool slides has been described. However, the invention also relates to the feed of the main slide. This is illustrated in FIG. 2, in which the main slide is designated 36. It is formed in principle as a hydraulic cylinder in which is provided a piston 37 on a fixed piston rod 38. One end of the cylinder is provided with a projecting portion 39 to which a bar 40 is fixed. Fixed to this bar is a guide pin 41 which fits into a groove 42 in a cam disk 43. This cam disk is mounted on the above mentioned shaft 31 and turns simultaneously with the crank 28. As is apparent from FIG. 2 the groove 42 is curved and forms a cam groove which guides the guide pin. In contrast to conventional lathes the cam transmits no force to the main slide 36 through the groove 42, the pin 41, the bar 40 and the projecting portion 39. The source of power is instead hydraulic, i.e. an hydraulic pressure medium which is led to the cylinder space 45 through a conduit 44 in the piston rod 38. The movement of the main slide is governed by the rotation of the cam 43. The cam 43 is turned about one half revolution at low speed in the direction of the feed. Thereafter the movement is reversed and the speed of rotation is increased to return the main slide as quickly as possible to its position of rest. The mechanism of the tool slides and the main slide is in principle the same, since the rollers 22 may be said to correspond to the guide pin 41 and the cams 23 and draw-bars 24 correspond to the groove 42 and the cam disk 43 respectively.

The members mentioned may be varied in various ways within the scope of the invention. FIGS. 3 and 4 show a six-spindle automatic lathe having somewhat modified members. On a bed 111 is a carrier 112 with six chucks 113 for bar stock which is operated upon by lathe tools 114 carried in tool holders 115 which are adjustably fixed to the tool slides 116. The tool slides are actuated in the direction of feed by hydraulic pressure through a conduit 118 which acts on a piston 119 fixed to the bed 111.

The four upper tool slides move in a substantially radial direction relative to the carrier 112 while the lower cross slides move along lines which differ from the radial so that the chips will more easily drop out. Between the tool slides and the bed is a ring 124 carried by a rolling bearing 144.

The ring 124 is provided with teeth 128 along a portion of its circumference and the ring is turned by means of a gear wheel 130 on a shaft 131. Cams 123 are adjustably mounted on the ring 124. Rollers 122 engage the cams the roller being fixed to the inside of the tool slide 116. The ring 124 is rotatable in both directions.

At the beginning of each working cycle a pressure is applied through the conduits 118. The tool slides are thus advanced inwardly until the rollers 122 engage the cams 123. The feeding movement takes place when the ring 124 is turned clockwise, during which the rollers follow the surfaces 134 on the cams 123 since the pistons 119 are subject to pressure which also acts on the tool slide 116. When the ring 131 has been turned a predetermined angle by the shaft 131 and the gear wheel 130 so that the tools have reached their final positions, its direction of movement is reversed to anti-clockwise and the tool slides are retracted thereby that the pressure is released from the chamber 117 and pressure is admitted to the chamber 120, the disk is turned 60°, the stock is fed forward and a new cycle can begin.

The mechanism for the axial feed also differs from that of the lathe shown in FIGS. 1 and 2. The shaft 131 on which the gear wheel 130 is mounted also transmits force for the feeding movement of the main slide. The shaft is carried at its other end in a bracket 145 on the bed 111 and is provided with a crank 143 which upon rotation of the shaft raises and lowers a draw-bar 140 on which is a cam 142. The main slide 136 is hydraulically displaced in a manner similar to that described in connection with FIGS. 1 and 2, i.e. thereby that hydraulic pressure acts alternately through conduits 146 and 147. The main slide is provided with a protruding member 139 at the end of which is carried a roller 143 which engages the cam 142. When the cam is displaced vertically the main slide 136 will be displaced axially under the action of the hydraulic pressure at a speed determined by the movement of the roller 143 along the cam 142.

Although the invention has been described in connection with a multi-spindle automatic lathe it is applicable to other machines having hydraulically operated slides where it is desired to positively control the rate of movement of such slides.

I claim:

1. A machine for successively working on a work piece at a plurality of locations comprising a plurality of work piece supporting members, a tool slide for a tool at each of said work supporting locations, hydraulic actuator means for each tool slide for moving the tool slide toward the work piece at a predetermined rate of movement in a feeding direction, relatively movable cam and cam follower on the machine and slide cooperating to effect movement of said slide in the feeding direction at a rate slower than said predetermined rate.

2. A multi-spindle automatic lathe for successively working on bar stock at a number of machining positions corresponding to the number of spindles, comprising a cross tool slide at each machining position, hydraulic actuator means for advancing the cross slides towards the work, said cross tool slides during the first motion from a position of rest being advanced quickly at a predetermined rate under hydraulic pressure and the feed movement thereafter being governed by force by means of mechanical means in the form of cams and members engaging the cam surfaces of said cam arranged to operate against hydraulic pressure and effect movement of the cross tool slides at a rate slower than said predetermined rate.

3. A machine as claimed in claim 1 wherein the work piece supporting members are mounted on a carrier and including second hydraulic actuator means for actuating the carrier relative to the tool slides and second cooperating relatively movable cam and cam followers on the machine and carrier operable to control movement of said carrier.

4. A machine as claimed in claim 3 wherein the hydraulic actuator comprises a piston assembly connected to the carrier housed in a cylinder and including a rotatably mounted cam disc having an arcuate groove therein and a guide pin follower engaging in said groove whereby upon rotation of said cam disc movement of said carrier is controlled.

5. A machine as claimed in claim 1 including a beam mounted in said machine, a pair of draw bars pivotally mounted at opposite ends of said beam and adapted for movement in a direction transverse to the direction of movement of the tool slides, said draw bars mounting a plurality of cams for each of said tool slides, a roller cam follower mounted on each of said tool slides engageable with its respective cam whereby upon movement of said bars movement of said slides in the feeding direction at said rate slower than said predetermined rate is effected.

6. A machine for successively working on a work piece at a plurality of locations comprising a frame structure, a carrier mounted in said frame structure, a plurality of work piece supporting members mounted on said carrier, an annular rotatably mounted member, a plurality of circumferentially spaced cams mounted on said annular member, a tool slide for a tool at each of said work supporting locations, adapted to engage a work piece at each of said work piece supporting locations, hydraulic actuating means for each of the tool slides operable to move the tool slides at a predetermined rate of movement in a feeding direction, a plurality of cam followers, one cam follower for each of said tool slides adapted to cooperatively engage with said cams on the annular member whereby upon rotation of said annular member movement of said tool slides in the feeding direction is effected at a rate slower than said predetermined rate.

7. A machine as claimed in claim 6 wherein the work piece supporting members are mounted on a carrier and including second hydraulic actuator means for actuating the carrier relative to the tool slides and second cooperating relatively movable cam and cam followers on the machine and carrier operable to control movement of said carrier.

References Cited by the Examiner
UNITED STATES PATENTS

| | | |
|---|---|---|
| 1,950,332 | 3/1934 | Pechmann. |
| 2,370,032 | 2/1945 | Groen. |
| 2,518,813 | 8/1950 | Pearson _____ 82—24 X |
| 2,540,323 | 2/1951 | Cross. |
| 2,579,566 | 12/1951 | Godfriaux. |
| 2,691,312 | 10/1954 | Stewart _____ 82—3 X |
| 2,713,283 | 7/1955 | Lomazzo. |
| 3,035,468 | 5/1962 | Hermann _____ 82—24 |

WILLIAM W. DYER, JR., *Primary Examiner.*

H. HINSON, *Assistant Examiner.*